United States Patent [19]

Kositpaiboon et al.

[11] Patent Number: 5,001,707
[45] Date of Patent: Mar. 19, 1991

[54] METHOD OF PROVIDING RESERVED BANDWIDTH IN A DUAL BUS SYSTEM

[75] Inventors: Rungnoj Kositpaiboon, Nepean; Richard Breault, Ottawa; Van P. T. Phung, both of Ottawa, all of Canada

[73] Assignee: Northern Telecom Limited, Montreal, Canada

[21] Appl. No.: 430,547

[22] Filed: Nov. 2, 1989

[51] Int. Cl.⁵ .............................. H04J 3/24; H04J 3/02
[52] U.S. Cl. ................................. 370/94.1; 370/85.1; 370/85.11; 370/85.6; 340/825.5
[58] Field of Search ................ 370/94.1, 85.2, 85.6, 370/85.7, 85.11, 85.15, 85.9, 84, 79, 95.3, 85.1; 340/825.5, 825.51

[56] References Cited

U.S. PATENT DOCUMENTS

| | | | |
|---|---|---|---|
| 3,961,139 | 6/1976 | Bowman et al. | 370/85.7 |
| 4,445,116 | 4/1984 | Grow | 370/85.6 X |
| 4,532,626 | 7/1985 | Flores | 370/94.1 X |
| 4,587,651 | 5/1986 | Nelson et al. | 370/85.12 |
| 4,763,321 | 8/1988 | Calvignac et al. | 370/85.1 X |
| 4,922,244 | 5/1990 | Hullett et al. | 370/94.1 X |
| 4,926,418 | 5/1990 | Cidon et al. | 370/85.5 |

OTHER PUBLICATIONS

Part of Section 2 entitled "Overview", (2.1-2.1.2.2 inclusive), Proposed Standard: DQDB Metropolitan Area Network, IEEE 802.6-89/45, p. 802.6 D9, Aug. 7, 1989.

Primary Examiner—Douglas W. Olms
Assistant Examiner—H. Kizou
Attorney, Agent, or Firm—Dallas F. Smith

[57] ABSTRACT

A method provides reserved bandwidth in a system having dual unidirectional and oppositely oriented buses. The method is intended to enhance the proposed standard, DQDB Metropolitan Area Network. A portion of the bandwidth shared by the stations in accordance with the proposed standard is reserved for distribution to stations on an as required basis. Each station making a request for bandwidth is allocated a part of the reserved bandwidth. Empty isochronous cells are used to provide the reserved bandwidth on the buses.

21 Claims, 11 Drawing Sheets

METHOD OF PROVIDING RESERVED BANDWIDTH IN A DUAL BUS SYSTEM

This invention relates to a method of operating dual unidirectional and oppositely oriented buses and is particularly concerned with provision of reserved bandwidth for stations along the buses.

A currently proposed subnetworking system for use in metropolitan area networks (MAN) is the distributed queue dual bus (DQDB) as defined in Proposed Standard: DQDB Metropolitan Area Network IEEE 802.6-89/45 Draft issued Aug. 7 1989. The DQDB 10 subnetwork consists of two oppositely oriented unidirectional buses and a plurality of stations distributed along the length of the buses. Communications between any two stations 1 and 2 on the buses uses one bus for information passing from 1 to 2 and the other bus for information passing from 2 to 1. The DQDB subnetwork offers two classes of communication for its stations. A first class is for synchronous traffic such as voice or video signals and a second class is for asynchronous traffic such as data communications. The bandwidth available for all traffic on the buses is divided between these two classes. The synchronous traffic is guaranteed a portion of this total bandwidth, with each station having a prearranged allocation of this total. The remaining available bandwidth is shared among stations based upon priority and position in a queue which is distributed across the buses, one distributed queue in each direction.

Each station is able to keep track of its position in the queue so that it knows when it may gain access to the bus to which the queue applies. In this way a substantially equal sharing of the bandwidth is provided for all stations. However, for some applications, the stations may require different bandwidths.

The object of the present invention is to provide an improved method of operating a distributed queue dual bus.

In accordance with one aspect of the present invention there is provided a method of providing reserved bandwidth in a communications system comprising dual unidirectional and oppositely directed buses and stations connected therebetween, in which bandwidth is provided by fixed format cells, the method comprising the step of: reserving bandwidth on a bus in response to requests accepted from stations on the bus; providing each station with a reserved bandwidth value calculated in dependence upon the reserved bandwidth of the station; generating a number of reserved bandwidth cells per a cell generation cycle in dependence upon a total bandwidth reserved by the stations; and at each station, counting each reserved bandwidth cell used until reaching the reserved bandwidth value.

Thus according to the present invention a portion of the bandwidth available for the second class of traffic is allocated for traffic requiring reserved bandwidth which can be allocated to stations on an as required basis.

In accordance with another aspect of the present invention there is provided a method of providing reserved bandwidth in a communications system comprising dual unidirectional and oppositely directed buses and stations connected therebetween, in which bandwidth is provided by fixed format cells, the method comprising the steps of: reserving bandwidth on a bus in response to requests accepted from stations on the bus; providing each station with a reserved bandwidth value calculated in dependence upon the reserved bandwidth of the station; providing each station with a local cycle value calculated in dependence upon an amount of reserved bandwidth available at the station; generating a number of reserved bandwidth cells per a cell generation cycle in dependence upon a total bandwidth reserved by the stations; at each station, counting each reserved bandwidth cell used until reaching the reserved bandwidth value; counting each reserved bandwidth cell received until reaching its local cycle value; and then restarting the steps of counting the reserved bandwidth cells used and counting the reserved bandwidth cells received.

In accordance with a further aspect of the present invention there is provided a method of providing reserved bandwidth in a communications system comprising dual unidirectional and oppositely directed buses and stations connected therebetween, in which bandwidth is provided by fixed format cells, the method comprising the steps of: reserving bandwidth on a bus in response to requests accepted from stations on the bus; providing each station with a reserved bandwidth value calculated in dependence upon the reserved bandwidth of the station; providing each station with a local cycle value calculated in dependence upon an amount of reserved bandwidth available at the station; generating a number of reserved bandwidth cells per a cell generation cycle in dependence upon a total bandwidth reserved by the stations; generating a reset cell to end the cell generation cycle, wherein at each station, the reset cell restarts the step of counting the reserved bandwidth cells used; and wherein the reserved bandwidth value is $X_i$, for each station i, calculated from $X_i = Y_b C_i / C_b$, where $C_b$ is the bus capacity for unreserved and reserved bandwidth cells, $C_i$ is the bandwidth requested by the station i, and $Y_b$ is an integer constant defining the cell generation cycle.

The invention will be further understood from the following description with reference to the drawings, in which.

Figure 1:
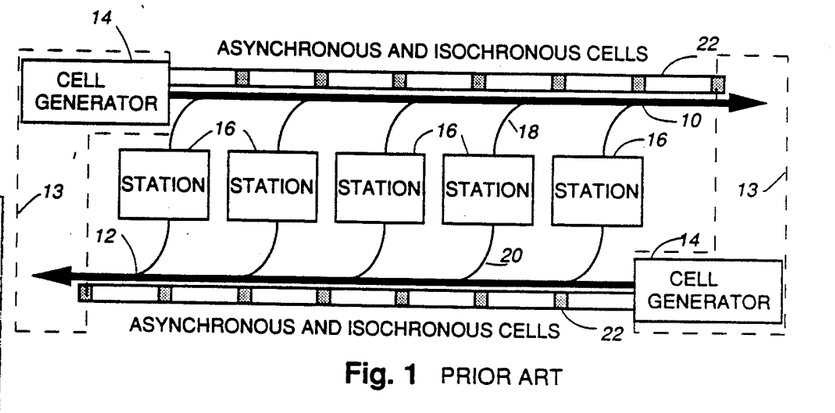
FIG. 1 diagrammatically illustrates a known distributed queue dual bus subnetwork.

Referring to FIG. 1, there is illustrated in block diagram form a distributed queue dual bus (DQDB) subnetwork. The DQDB subnetwork includes unidirectional buses 10 and 12 which are oppositely oriented and bus terminators 13. The bus terminators 13 each include a cell generator 14 at the head of each of the buses 10 and 12 and a connection (not shown in FIG. 1) for passing requests from one bus to the cell generator of the other bus. A plurality of stations 16 are distributed along the buses, each having access 18 to bus 10 and access 20 to bus 12. The cell generators 14 at the head of each bus 10 and 12 generate time division multiplexed cells 22 in accordance with a format defined by the proposed standard. These cells effectively segment the bus capacity into pieces which are then made available to the stations for providing access to the bus. The format of these cells is diagrammatically illustrated in FIG. 2. The cell, which is made up of serially transmitted bits is diagrammed in rectangular form with a first bit being in an upper left hand corner and a last bit being in a lower right hand corner, and with intervening bits being ordered from left to right in rows, and with the rows ordered from top to bottom.

Figure 2:
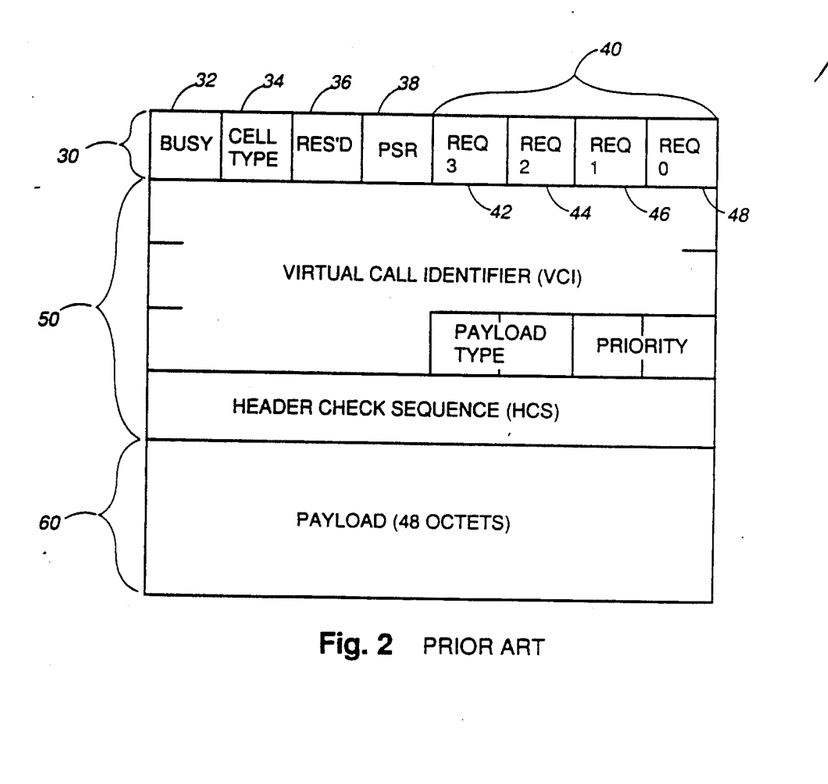
FIG. 2 diagrammatically illustrates a known proposed cell format from the IEEE 802.6 proposed standard.

The cell includes an 8-bit access control field (ACF) 30 including a 4-bit request field 40, a 4-octet (32-bit) segment header 50, and a 48-octet segment payload 60.

The access control field includes a busy bit 32, a cell type bit 34, a reserved bit 36 and a PSR bit 38. The request field includes four request bits 42, 44, 46 and 48.

Of particular relevance to this invention are the busy bit 32 and the cell type bit 34 and the request bits 42, 44, 46 and 48.

In operation the cell generator 14 produces two types of cells: busy isochronous cells and empty asynchronous cells also known as pre-arbitrated (PA) slots and queue arbitrated (QA) slots, respectively. A first type, the busy isochronous cell is used for synchronous traffic which requires a switched circuit like connection. The cell generator 14 sets the busy bit 32 to a logic value 1 and the cell type to a logic value 1 to indicate an isochronous cell. The busy isochronous cell carries a virtual channel identifier which is recognized by the station allowed to make use of the cell. The busy isochronous cells occupy a portion of the total capacity of the bus. The remaining capacity is provided by empty asynchronous cells.

The cell generator 14 provides an empty asynchronous cell by setting the busy bit 32 and the cell type bit 34 to 0. Thus, each station needs to read only two bits to determine both the type of cell and whether that cell is busy or not. The busy isochronous cells represent prearranged bandwidth and are only available for use by the station for which they were generated. The empty asynchronous cells by contrast, are shared among the stations along the bus. In the currently proposed standard, the sharing is accomplished through the use of a distributed queue.

Figure 3:
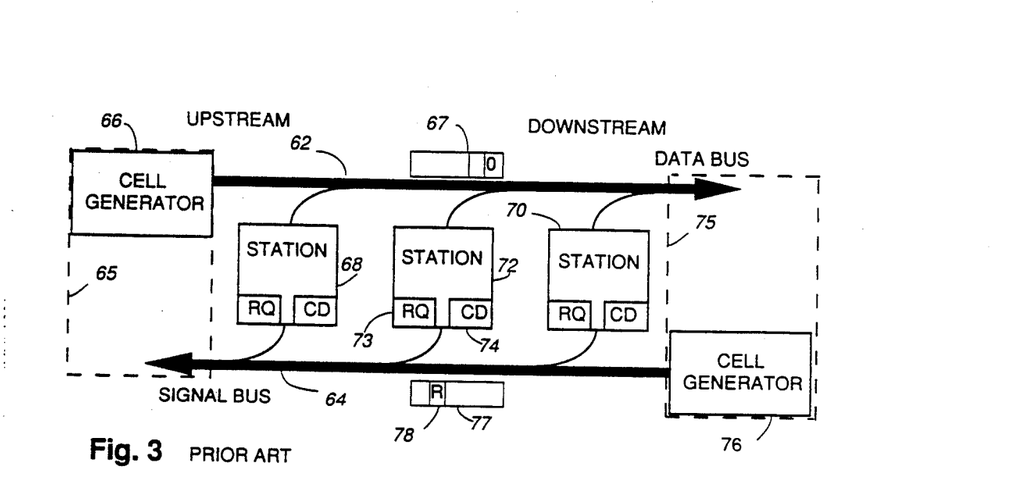
FIG. 3 diagrammatically illustrates upstream and downstream stations with respect to one of the buses of a distributed queue dual bus.

In FIG. 3 the DQDB bus is illustrated having a data bus 62 and a signal bus 64, reverse with respect to the bus 62, and bus terminators 65 and 75. The bus terminators 65 and 75 include cell generators 66 and 76, respectively and connections (not shown in FIG. 3) for passing requests from one bus to the cell generator of the other bus. For simplicity of explanation only the operation of one bus 62 will be discussed as a data bus, however, both buses 62 and 64 operate in the same manner. The cell generator 66 generates cells 67 on the forward bus 62 for transfer of data from upstream stations to downstream stations, a station 68 being the first station and a station 70 being the Nth station on the bus 62. A station 72 represents intervening stations along the bus. The cell generator 76 at the head of the bus 64 generates cells 77 in a reverse direction. The stations 70 and 72 use the signal bus 64 for transmitting requests to the stations upstream with respect to the direction of the bus 62. A request is sent by setting a request bit 78 in a cell 77 on the signal bus 64.

The proposed standard specifies four request bits, one for each of four levels of priority, however, for simplicity only a single request bit will be considered. Each station has two counters, a request counter RQ and a countdown counter CD. The request counter value is increased by 1 for each request passing the station on the signal bus 64. The countdown counter value, if it is not zero, is decreased by 1 for each empty asynchronous cell passing the station on the data bus 62. Thus at any time every station knows how many outstanding requests there are for stations downstream of it. When the station 72 needs to send a data packet, it sends a request to the upstream stations represented by the station 68, by setting a request bit 78 in a cell 77 on the reverse bus 64, and at that time transfers the number in its request counter 73 to its countdown counter 74. The countdown counter 74 counter value CD is decreased by 1 for each empty asynchronous cell passing on the data bus 62 until CD=0, at which time the station 72 transmits its packet in the next empty asynchronous cell on the bus 62. Meanwhile the request counter 73 value RQ is reset to 0 after passing its count to the countdown counter 74 and continues to count the requests from downstream stations, e.g. station 70. The station 72 must wait until it has sent the first packet before it is able to send another request bit to queue a second packet to be sent.

As stated hereinabove, operation of the bus 64 as the data bus is the same. Thus each station maintains separate request and countdown counter for each of the two buses.

This system provides a very simple and effective method of distributing the bandwidth which is not prearranged. In this way a substantially equal sharing of the bandwidth is provided for all stations. However, for some applications, the stations may require different bandwidths.

In accordance with the present invention a method is provided in which the cell generator generates empty isochronous cells in addition to empty asynchronous cells. The empty isochronous cells use a portion of the bandwidth that would be distributed by the empty asynchronous cells. The empty isochronous cells are used to provide a reserved bandwidth traffic class.

Figure 4:
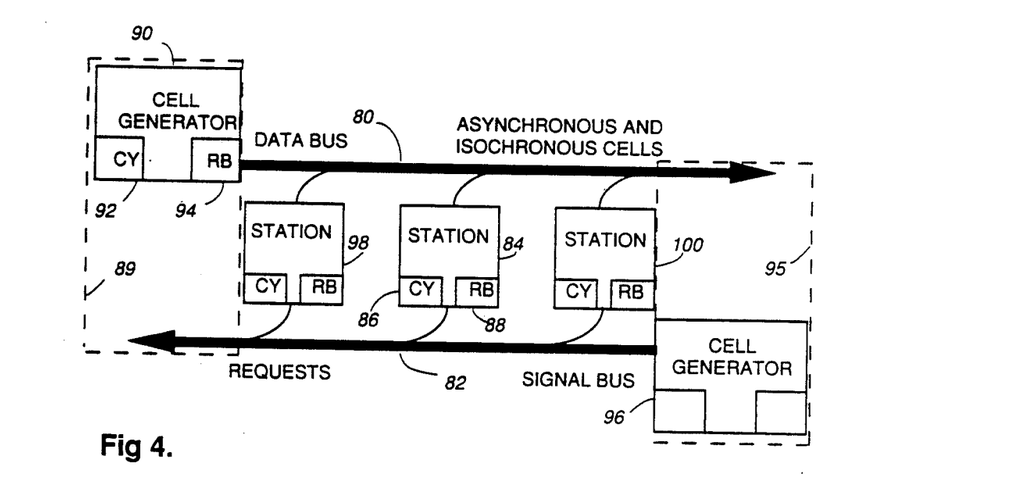
FIG. 4 diagrammatically illustrates a distributed queue dual bus operated in accordance with a first embodiment of the present invention.

Referring to FIG. 4 there is illustrated a DQDB subnetwork operated in accordance with an embodiment of the present invention.

As above only one direction of operation is discussed for convenience.

The DQDB subnetwork includes a data bus 80 which carries asynchronous and isochronous cells in a first direction that can be referred to as downstream and a signal bus 82 which carries requests in a second (opposite) direction which can be referred to as upstream.

A station 84 is coupled to both buses 80 and 82 and includes two counters, a cycle counter (CY) 86 and a reserved bandwidth counter (RB) 88. The station 84 has in addition the request RQ and countdown CD counters (not shown in FIG. 4) required for use of the asynchronous cells as described hereinabove.

The DQDB subnetwork also includes bus terminators 89 and 95 at the ends of the buses 80 and 82. The bus terminators 89 and 95 include cell generators 90 and 96 connected to the head of buses 80 and 82, respectively, and connections (not shown in FIG. 4) for passing requests from one bus to the cell generator of the other bus.

The cell generator 90 is connected to the head of the data bus 80 and includes a cycle counter (CY) 92 and a reserved bandwidth counter (RB) 94. An upstream station 98 and a downstream station 100 are also connected to the data and signal buses 80 and 82. The cell generator 90 differs from the cell generator of the proposed standard in that it provides three different cells, busy isochronous, empty asynchronous and empty isochronous. The busy isochronous and empty asynchronous cells are generated in the manner known in the art and briefly discussed above. The empty isochronous cells are generated in a similar manner but with the busy bit set to 0 and the cell type bit set to 1. The discussion here will be concerned only with the use of empty isochronous cells.

On initialization of the DQDB subnetwork, all stations 84, 98 and 100 on the bus and the cell generator 90 resets its respective reserved bandwidth (RB) counters to 0 and their respective cycle (CY) counters to 1. The stations requiring reserved bandwidth send requests via the signalling bus 82 to the cell generator 90. Each station i requests the actual bandwidth required $C_i$. The cell generator 90 calculates how bandwidth is to be allocated from $$C_s = C_b - \sum_{i=1}^{N} C_i \qquad \text{eq. 1}$$

where $C_b$ is the bandwidth available for nonprearranged traffic, $C_s$ is the non-allocated bandwidth provided by empty asynchronous cells and $C_i$ are the bandwidths requested by the N stations. The cell generator 90 also calculates the values for the RB and CY counters for each station. Defining $B_i$ as the reserved bandwidth available at each station i given by $$B_i = C_b - C_s - \sum_{j=1}^{i-1} C_j \qquad \text{eq. 2}$$

then the bandwidth requested by each station i, $C_i$ can be expressed as eq. 3: $C_i = B_i X_i / Y_i$. Using equations 1-3, the available bandwidth $C_b$ and the individual station bandwidth $C_i$ the cell generator calculates $X_i$ and $Y_i$ for each station usually in smallest integral form e.g. $X_i/Y_i = 5/100$ becomes 1/20 hence $X_i = 1$, $Y_i = 20$.

These values become the initial counter values for the station, thus $CY = Y_i$ and $RB = X_i$, with $X_i$ greater than or equal to 0 and $Y_i$ greater than or equal to 1. The cell generator also calculates its own CY and RB values. These values are computed from $$X_H/Y_H = \sum_{i=1}^{N} C_i / C_b. \qquad \text{eq. 4}$$

The calculated $X_i$ and $Y_i$ values are then transmitted to the stations which use them to set their respective RB and CY counters. The cell generator loads its counters with the $Y_H$ and $X_H$ values, that is $CY = Y_H$ and $RB = X_H$ and begins to generate the empty isochronous cells and empty asynchronous cells in accordance with a method represented by the flow chart shown in FIG. 5.

Figure 5:
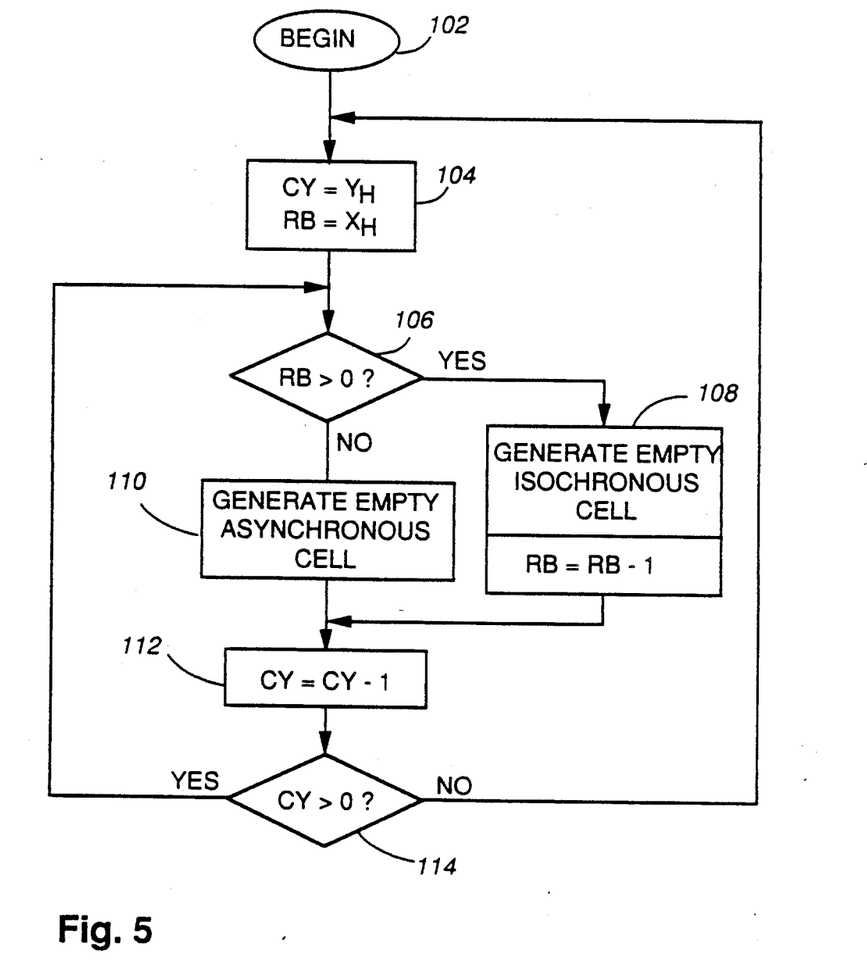
FIG. 5 in a flow chart illustrates a first embodiment of the method of generating empty asynchronous and empty isochronous cells providing grouping of the cells by type.
Figure 6A:
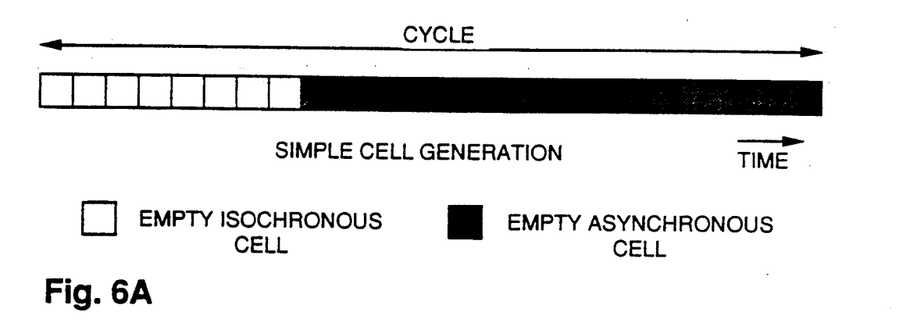
FIGS. 6a and 6b diagrammatically illustrate simple and distributed cell generation.
Figure 6B:
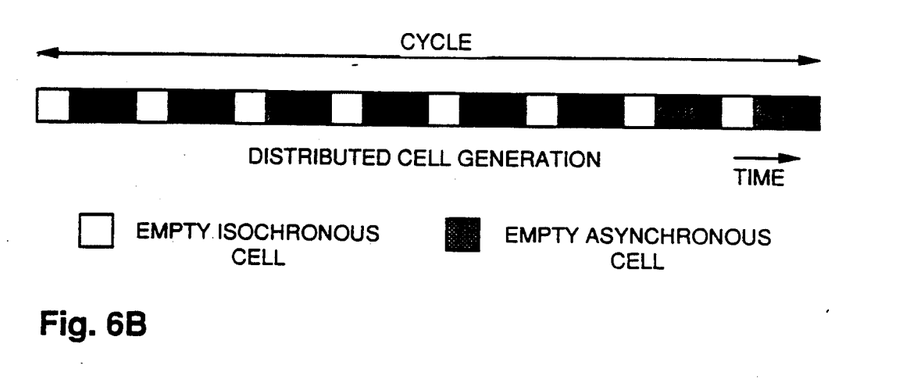

The method begins with a block 102, a block 104 represents loading the cell generator counters with initial values $CY = Y_H$ and $RB = X_H$. A block 106 queries whether RB is greater than zero. A yes response leads to block 108 representing the steps of generating an empty isochronous cell and decreasing the RB counter by 1 followed by a block 112. A no response leads to a block 110 representing generating an empty asynchronous cell followed by the block 112 which decreases the CY counter value by 1. A block 114 then queries whether CY is greater than zero. A yes response leads back to the block 106. A no response leads back to the block 104. The method results in a simple distribution of the empty isochronous and empty asynchronous cell as illustrated in FIG. 6a. It may be more desirable to provide distributed cell generation as shown in FIG. 6b.

A different method of cell generation is required to achieve a distributed cell generation. The changes involve the way the RB counter 94 of the cell generator 90 is initialized and set to achieve this distribution. On initialization, the RB counter is set to 0 and if $X_H$ is greater than 0 is subsequently set to a value $Z_H$ calculated from: eq. 6: $Z_H = [Y_H/X_H] - 1$ where the square brackets denote the greatest integer not greater than the rational number $Y_H/X_H$. Note if $X_H$ equals 0, only empty asynchronous cells are generated.

Figure 7:
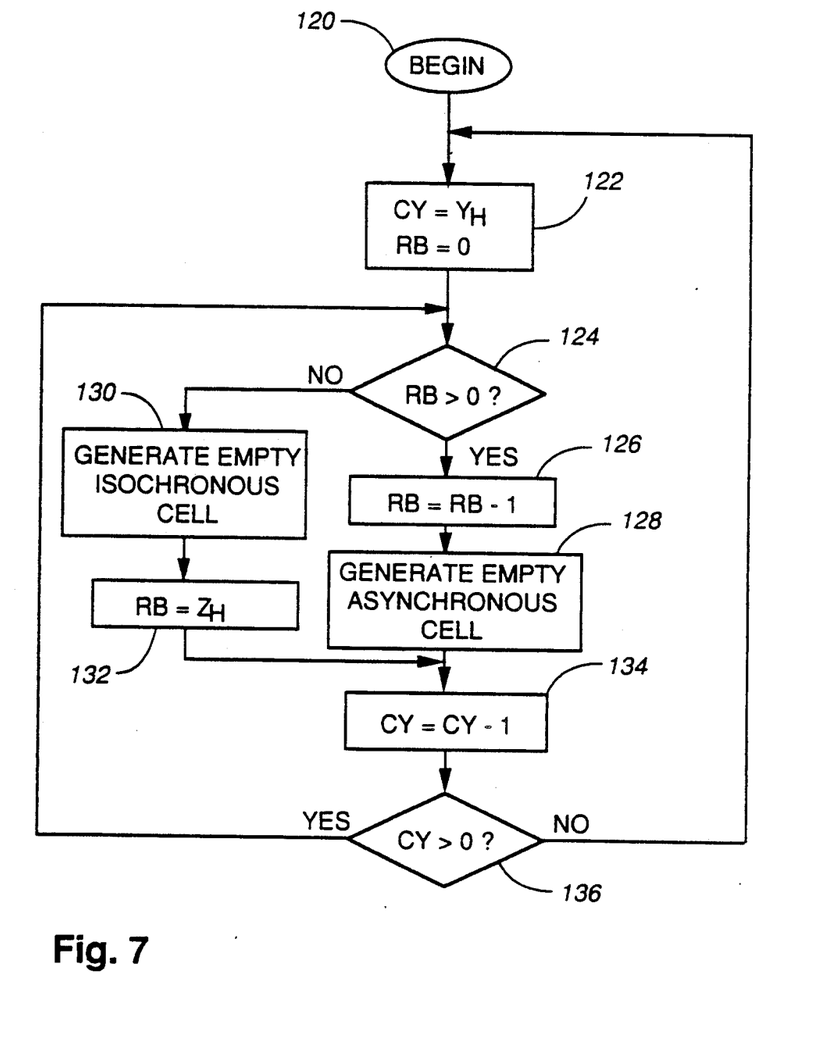
FIG. 7 in a flow chart illustrates a second embodiment of the method of generating empty asynchronous and empty isochronous cells providing distribution of the cells by type.

The distributed cell generation method is represented by FIG. 7. The method begins with a block 120 followed by a block 122 representing initializing the counter values $CY = Y_H$ and $RB = 0$. A block 124 queries whether RB is greater than zero. A yes response leads to a block 126 which decreases the RB counter value by 1, and a block 128 which generates an empty asynchronous cell, followed by a block 134. A no response leads to a block 130 which generates an empty isochronous cell and a block 132 which sets the RB counter value equal to $Z_H$ followed by the block 134 which decreases the CY counter value by 1. A block 136 then queries whether CY is greater than zero. A yes response leads back to the block 124. A no response leads back to the block 122.

The empty asynchronous cells generated by the cell generator are used by the stations as described hereinabove in accordance with the proposed standard.

Figure 8:
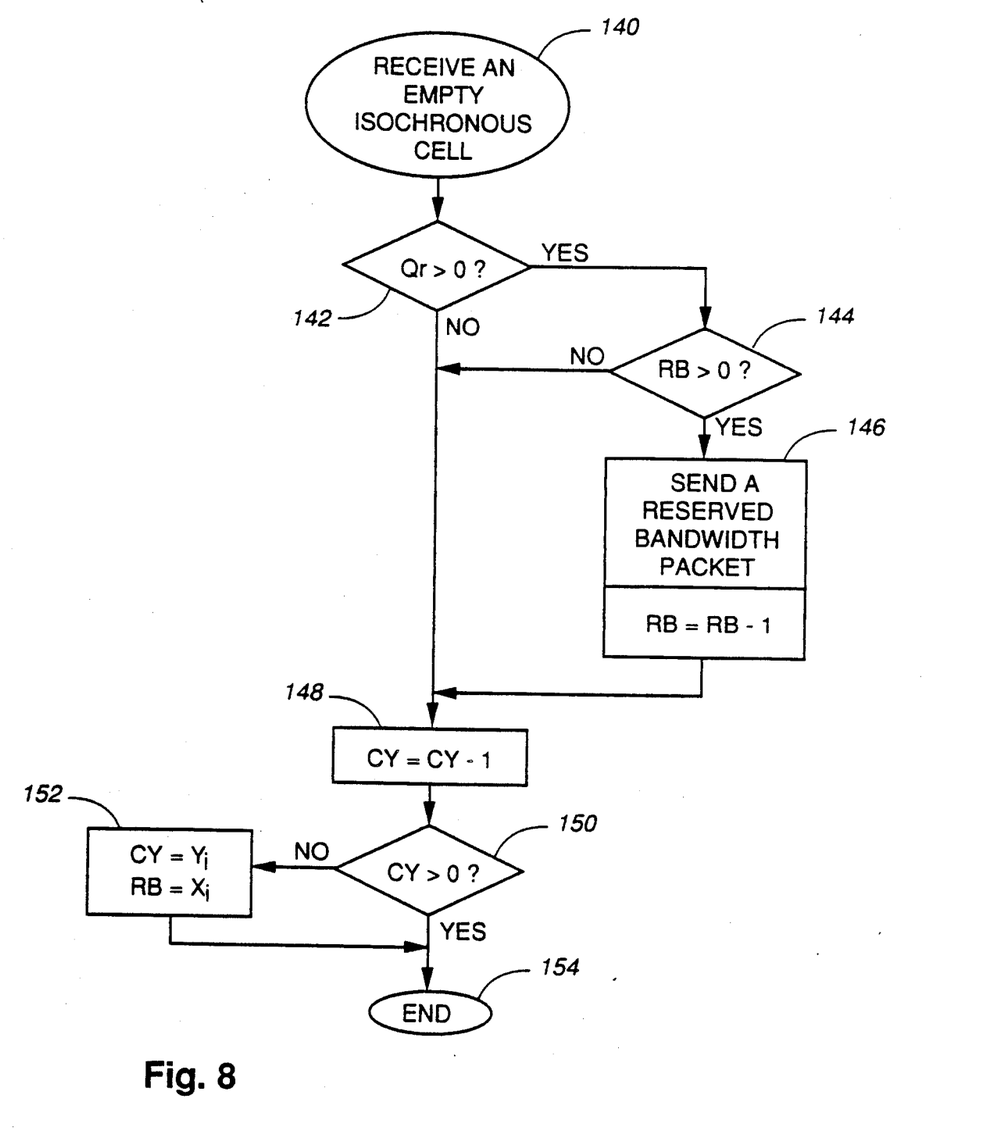
FIG. 8 is a flow chart of the Media Access Control (MAC) protocol for use of empty isochronous cells.

The stations along the bus use the empty isochronous cells in accordance with a method represented by the flow chart shown in FIG. 8.

A station receiving an empty isochronous cell is represented by a block 140. A block 142 queries whether a number of reserved bandwidth packets in a buffer, denoted as Qr, is greater than zero. A yes response leads to a block 144 which queries whether the RB counter value is greater than zero. A yes response leads to a block 146 representing the steps of sending a reserved bandwidth packet and decreasing the RB counter value by 1 followed by a block 148. A no response to the block 142 leads directly to the block 148. A no response to the block 144 also leads to the block 148. The block 148 represents decreasing the CY counter value by 1. Next, a block 150 queries whether the CY value is greater than zero. A yes response leads to an end with a block 154. A no response leads to a block 152 which resets CY equal to Yi and RB equal to $X_i$, followed by the end with the block 154.

Figure 9:
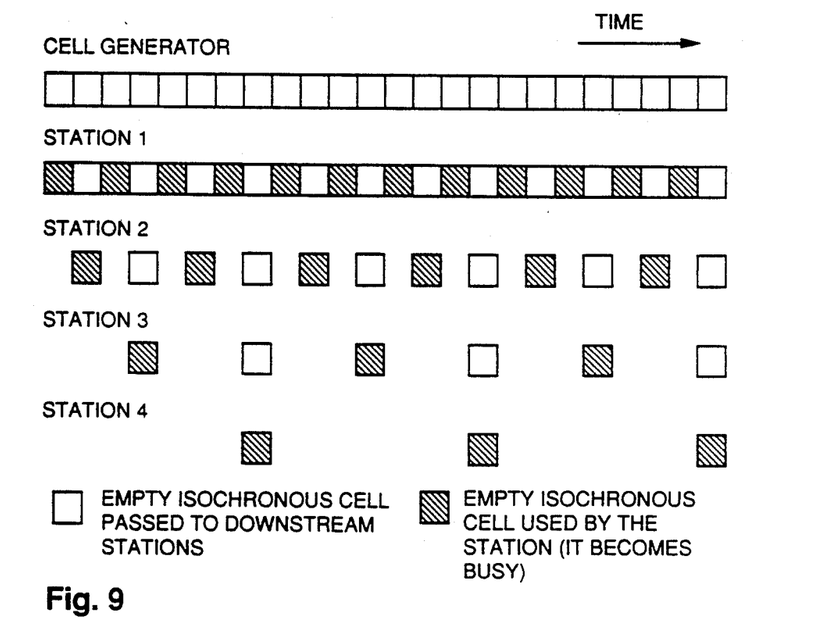
FIG. 9 diagrammatically illustrates how empty isochronous cells are used by the stations for reserved bandwidth traffic.

In FIG. 9 an example of the use of the empty isochronous cells is shown, only empty isochronous cells are considered. Consider a network with 4 stations whose bandwidth requirements are 50%, 25%, 12.5% and 12.5% of the total allocated bandwidth $$\left( \text{i.e.} \sum_{i=1}^{N} C_j \right),$$

respectively. The initial values of the RB and CY counters obtained from equations 2 and 3 are the following:
Station 1: $X_1 = 1$; $Y_1 = 2$ (i.e. 50% of total bandwidth)
Station 2: $X_2 = 1$; $Y_2 = 2$ (i.e. 50% of remaining bandwidth)
Station 3: $X_3 = 1$; $Y_3 = 2$ (i.e. 50% of remaining bandwidth)
Station 4: $X_4 = 1$; $Y_4 = 1$ (i.e. 100% of remaining bandwidth)

Any station requiring additional bandwidth may do so by sending a request to the cell generator. Such a response causes the cell generator to recalculate all the RB and CY counter values for the DQDB subnetwork, just as at initialization. Thus, this method provides dynamically allocated bandwidth, which is available after only a relatively short delay required to compute the new counter values.

Figure 10:
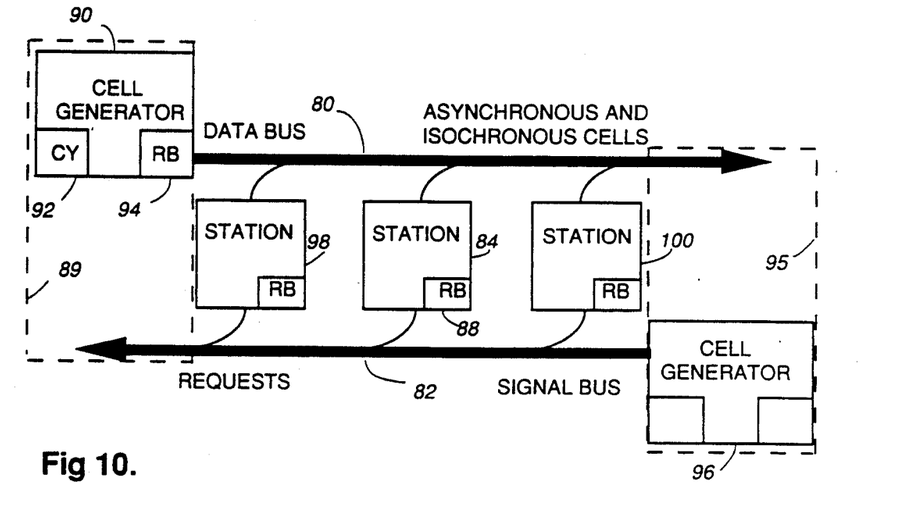
FIG. 10 diagrammatically illustrates a distributed queue dual bus operated in accordance with a second embodiment of the present invention.

Referring to FIG. 10 there is illustrated a DQDB subnetwork operated in accordance with a second embodiment of the present invention.

As above only one direction of operation is discussed for convenience.

The DQDB subnetwork again includes the data bus 80, the signal bus 82, and the bus terminators 89 and 95 as described in relation to FIG. 4. The station 84 in the second embodiment includes a single counter, a reserved bandwidth counter (RB) 88. The station 84 has in addition the request and countdown counters (not shown in FIG. 10) required for use of the asynchronous cells as described hereinabove.

As in FIG. 4, the cell generator 90 is connected to the head of the data bus 80 and includes a cycle counter (CY) 92 and a reserved bandwidth counter (RB) 94. A second cell generator 96 is connected to the signal bus 82. An upstream station 98 and a downstream station 100 are also connected to the data and signal buses 80 and 82.

On initialization of the DQDB subnetwork, all stations 84, 98 and 100 on the bus reset their respective reserved bandwidth (RB) counters to 0. The cell generator 90 sets its CY counter 92 to a value of Yb and its RB counter 94 to a value of 0. Yb is a constant integer value selected based upon a balance between a need to be responsive to the stations' requests for additional bandwidth, i.e. how long the cycle will be and the granularity of the allocated bandwidth, i.e. what is the smallest unit of bandwidth that can be provided to each station. As a simple example, if Yb were equal to 10 then the total reserved bandwidth could only be allocated in pieces which are multiples of 1/10th the total bandwidth.

As a consequence of the cycle length being a fixed integral value, the stations need only the RB counter to keep track of their bandwidth allocation. After initialization, the stations requiring reserved bandwidth send requests via the signalling bus 82 to the cell generator 90, during a first cycle. The request may take one of two forms. If the stations along the bus know the cycle length, they can calculate their own counter value $X_i$ from eq. 7: $X_i = Y_b C_i / C_b$ where Ci and Cb are as defined for equations 1 and 2.

In this case, the request sent to the cell generator 90 would include the new value of $X_i$. On the other hand, if the stations do not know the cycle length $Y_b$, they request the actual bandwidth required $C_i$. The cell generator then calculates the new $X_i$ value from eq. 7. In either case, if the request can be accommodated, the station that sent the request is sent an acknowledgement and updates its initial $X_i$ with the new value. However, the station must then wait until a reset at the end of the cycle to use this new value.

The cell generator also calculates its RB value. This value is computed from $$Z_g = \sum_{i=1}^{N} X_i. \qquad \text{eq. 8}$$

Note if Zg equals 0, only empty asynchronous cells will be generated.

Figure 11:
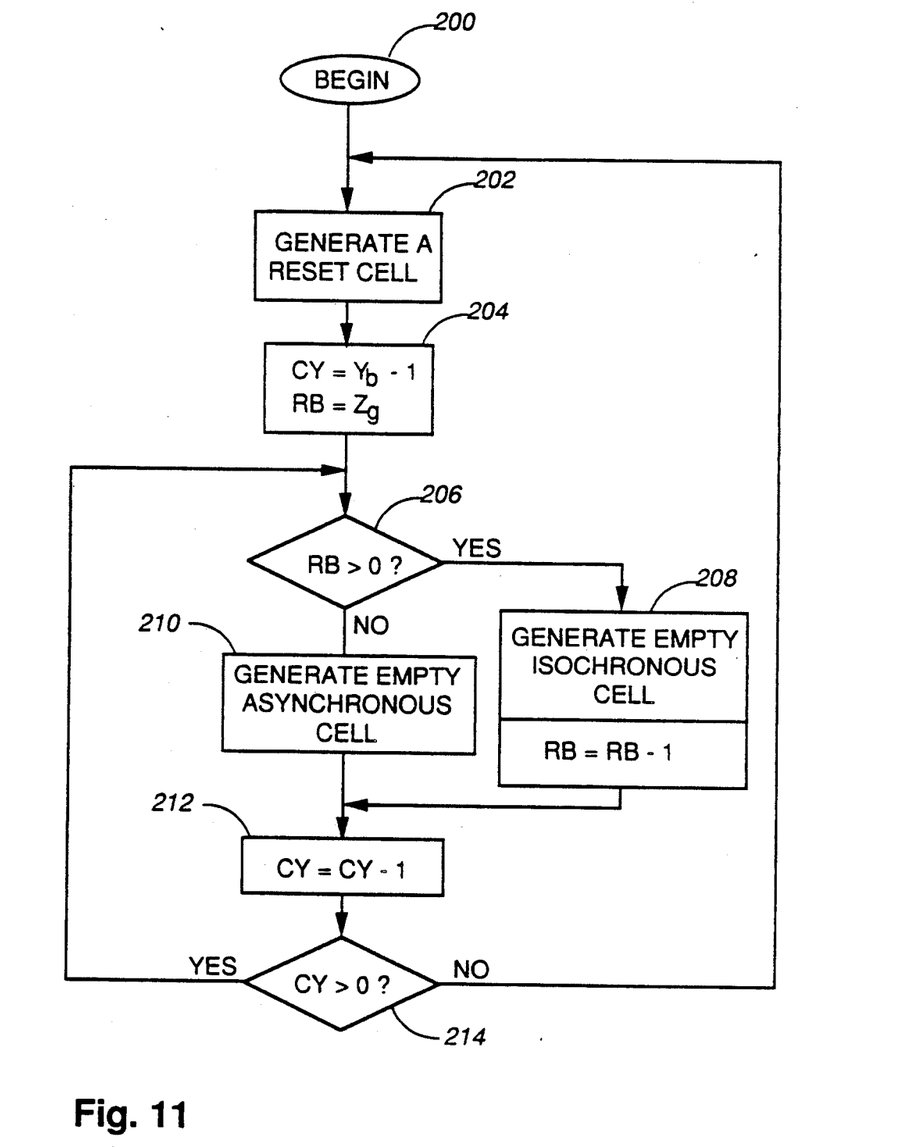
FIG. 11 in a flow chart illustrates a third embodiment of the method of generating empty asynchronous and empty isochronous cells which provides grouping of the cells by type.

At the end of a cycle, the cell generator loads its counters with initial values, that is $CY = Y_b$ and $RB = Z_g$ and begins to generate the empty isochronous cells and empty asynchronous cells in accordance with a method represented by the flow chart shown in FIG. 11.

The method begins with a block 200, a block 202 represents generating a reset cell which starts a new cycle and causes the stations to reset their RB counters. The reset cell may be implemented as a cell with the reserved bit 36 of FIG. 2 set to 1 or a busy asynchronous cell with a special virtual call identifier. This is followed by a block 204 loading the cell generator counter values $CY = Y_b - 1$ and $RB = Z_g$. A block 206 queries whether RB is greater than zero. A yes response leads to a block 208 representing the steps of generating an empty isochronous cell and decreasing the RB counter value by 1 followed by a block 212. A no response leads to a block 210 representing the generation of an empty asynchronous cell followed by the block 112 which decreases the CY counter value by 1. A block 214 queries whether CY is greater than zero. A yes response leads back to the block 206. A no response leads back to the block 202.

Figure 12A:
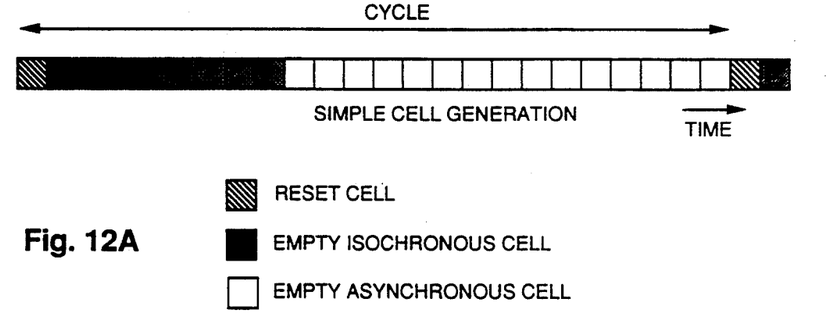
FIGS. 12a and 12b diagrammatically illustrate simple and distributed cell generation.
Figure 12B:
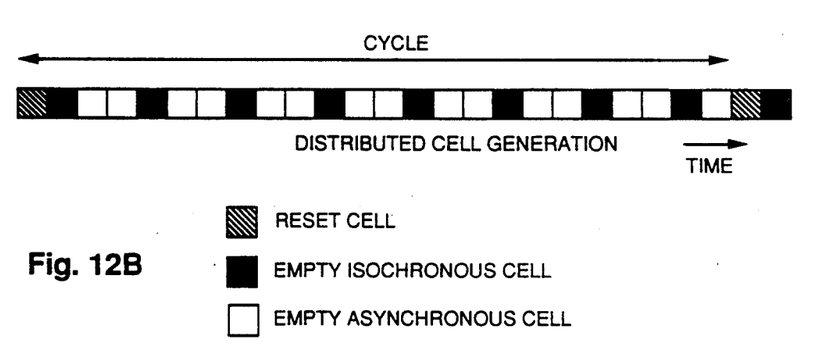

The method results in a simple distribution of the empty isochronous and empty asynchronous cell as illustrated in FIG. 12a. It may be more desirable to provide distributed cell generation as shown in FIG. 12b.

A different method of cell generation is required to achieve a distributed cell generation. The changes involve the way the RB counter of the cell generator 92 is initialized and set. On initialization the RB counter is set to 0 and if $Z_g$ is greater than 0 is subsequently set to a value $Z_s$ calculated from: eq. 9: $Z_s = [Y_b/Z_g] - 1$ where the square brackets denote the greatest integer not greater than the rational number $Y_b/Z_g$. Note if $Z_g$ equals 0, only empty asynchronous cells are generated.

Figure 13:
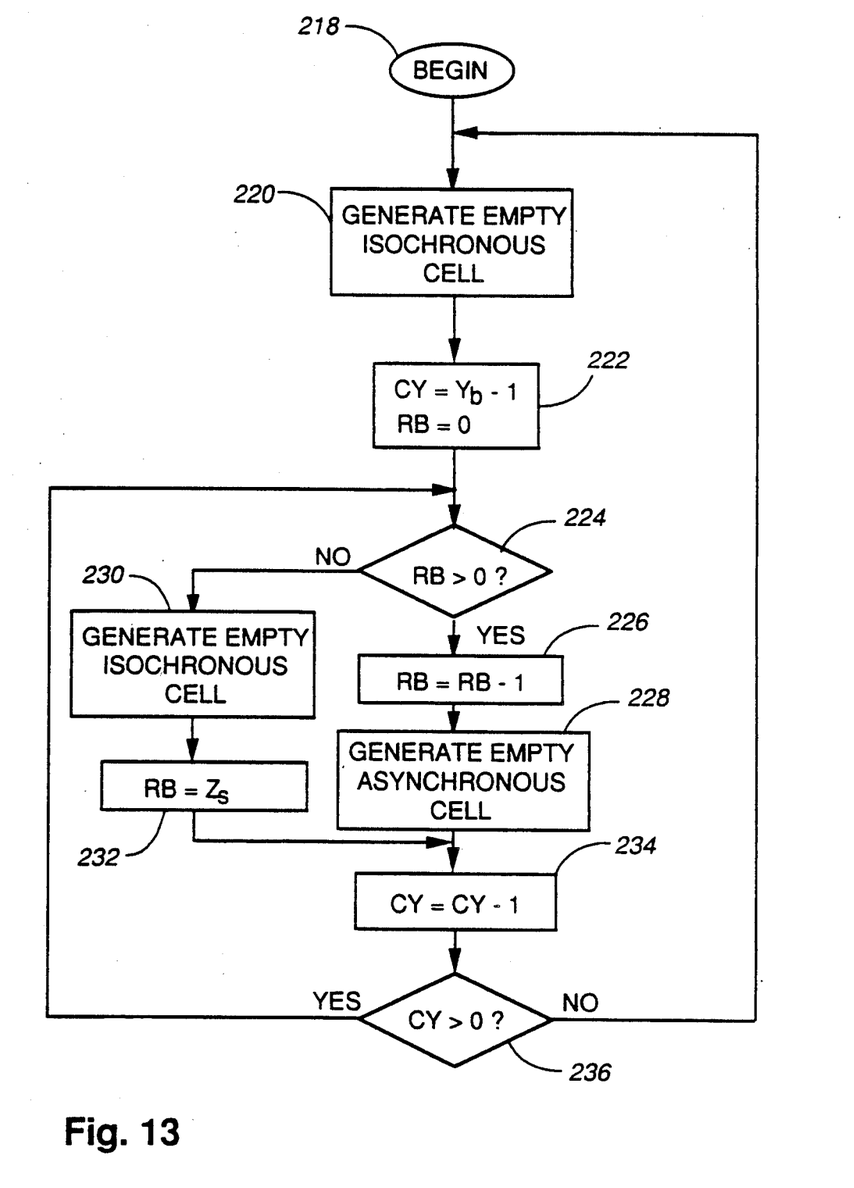
FIG. 13 illustrates in a flow chart a fourth embodiment of the method of generating empty asynchronous and empty isochronous cells providing distribution of the cells by type.

The distributed cell generation method is represented by FIG. 13. The method begins with a block 218 followed by a block 220 which generates a reset cell. Next is a block 222 representing setting the counter values $Cy = Y_b - 1$ and $RB = 0$. A block 224 queries whether RB is greater than zero. A yes response leads to a block 226 which decreases the RB counter value by 1, and a block 228 which generates an empty asynchronous cell, followed by a block 234. A no response leads to a block 230 which generates an empty isochronous cell and a block 232 which sets the RB counter to a value equal to $Z_s$ followed by the block 234 which decreases the CY counter value by 1. A block 236 then queries whether CY is greater than zero. A yes response leads back to the block 224. A no response leads back to the block 220. The empty asynchronous cells generated by the cell generator 90 are used by the stations as described hereinabove in accordance with the proposed standard.

Figure 14:
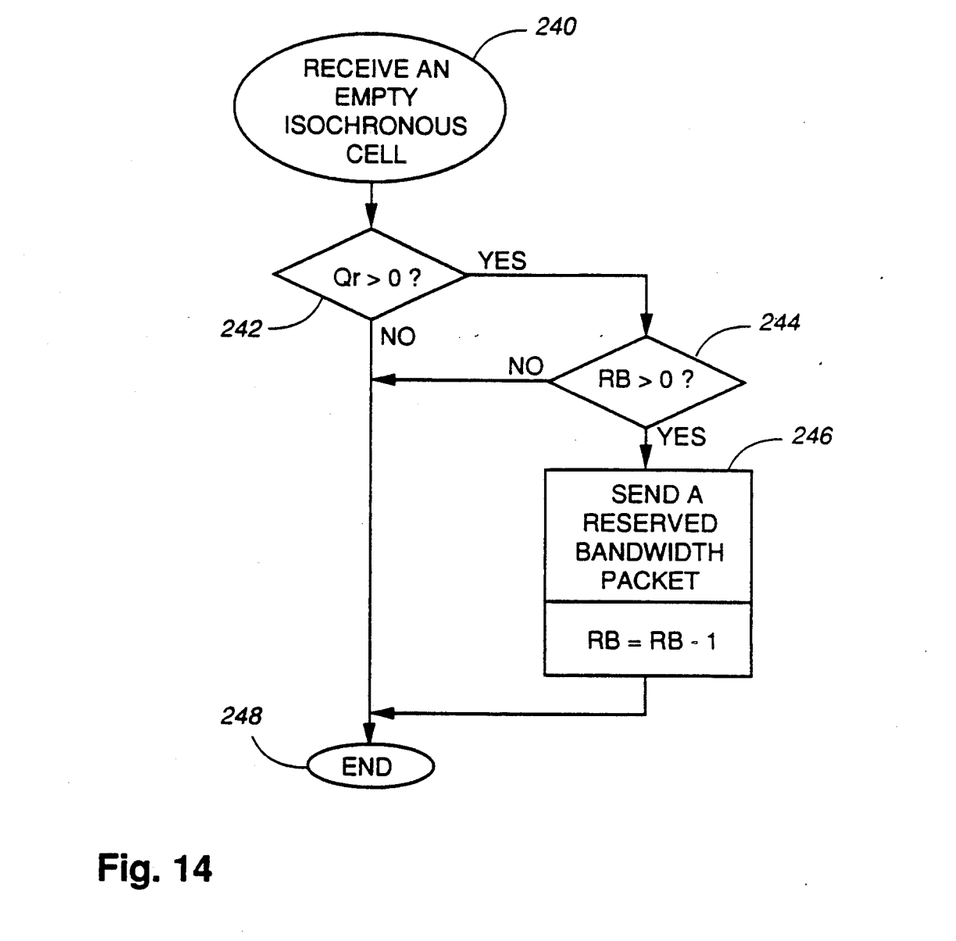
FIG. 14 is a flow chart of a fourth embodiment of the MAC protocol for use of empty isochronous cells.

The stations along the bus use the empty isochronous cells in accordance with a method represented by the flow chart shown in FIG. 14.

A station receiving an empty isochronous cell is represented by a block 240. A block 242 queries whether a number of reserved bandwidth packets in a buffer, denoted as Qr, is greater than zero. A yes response leads to a block 244 which queries whether the RB counter value is greater than zero. A yes response leads to a block 246 representing the steps of sending a reserved bandwidth packet and decreasing the RB counter value by 1 followed by an end with a block 248. A no response to the block 242 leads directly to the end block 248. A no response to the block 244 also leads to the end block 248.

Any station requiring additional bandwidth may do so by sending a request to the cell generator during a cycle. Such a response causes the cell generator to recalculate its RB counter value for the next cycle. Thus, this method also provides dynamically allocated bandwidth, which is available after a delay dependent upon the cycle time and the processing time.

An advantage of the present invention is being able to provide different amounts of reserved bandwidth to stations on the bus. Another advantage of the present invention is allowing the reserved bandwidth for any station on the bus to be increased or decreased on an as required basis, bus traffic permitting.

A variation of the present invention eliminates the four priority levels of the asynchronous cells and uses only one level of priority. This is not an unreasonable approach as the reserved bandwidth provided by the empty isochronous cells can be used in place of priority asynchronous cells. The variation reduces the number of request bits required in the cell to one. The variation proposes using the reserved bit 36 of FIG. 2, as the request bit for asynchronous cell queuing, and using the request bits 42, 44, 46, and 48 of FIG. 2 as part of the virtual call identifier. In so doing, the cell becomes compatible with the cell used in a proposed broadband Integrated Services Digital Network (B_ISDN) standard of the Consultative Committee for International Telegraph and Telephone (CCITT).

Numerous other modifications, variations and adaptations may be made to the particular embodiments of the invention described above without departing from the scope of the invention as defined in the claims.

What is claimed is:

1. A method of providing reserved bandwidth in a communications system comprising dual unidirectional and oppositely directed buses and stations connected therebetween, in which bandwidth is provided by fixed format cells, the method comprising the step of:

reserving bandwidth on a data bus in response to requests accepted from stations on a signal bus;

providing each station with a reserved bandwidth value calculated in dependence upon an amount of bandwidth requested by the station;

generating a number of reserved bandwidth cells per a cell generation cycle in dependence upon a total bandwidth requested by the stations; and at each station, counting each reserved bandwidth cell used until reaching the reserved bandwidth value.

2. A method as claimed in claim 1 wherein the step of generating a number of reserved bandwidth cells provides cells at a beginning of the cell generation cycle.

3. A method as claimed in claim 2 wherein the number of reserved bandwidth cells is $X_H$ and the cell generation cycle is $Y_H$, calculated from $$X_H/Y_H = \sum_{i=1}^{N} C_i/C_b,$$

where $C_b$ is the bus capacity for unreserved and reserved bandwidth cells and $C_i$ are the bandwidths requested by each station i of N stations.

4. A method as claimed in claim 2 wherein the number of reserved bandwidth cells is $Z_g$ and the cell generation cycle is $Y_b$, where $Y_b$ is an integer constant and $Z_g$ is the sum of the reserved bandwidth values for the stations.

5. A method as claimed in claim 1 wherein the step of generating a number of reserved bandwidth cells provides cells distributed throughout the cell generation cycle.

6. A method as claimed in claim 5 wherein the cells are distributed by generating a reserved bandwidth cell, then $Z_H$ non-reserved cell until $Y_H$ cells are generated, where $X_H$ is the number of reserved bandwidth cells and $Y_H$ is calculated from $$X_H/Y_H = \sum_{i=1}^{N} C_i/C_b,$$

where $C_b$ is the bus capacity for unreserved and reserved bandwidth cells and $C_i$ are the bandwidths requested by each station i of N stations and $Z_H$ equals the greatest integer less than $(Y_H/X_H)$, minus one.

7. A method as claimed in claim 5 wherein the cells are distributed by generating a reserved bandwidth cell, then $Z_s$ nonreserved cell until $Y_b$ cells are generated, where $Y_b$ is an integer constant defining the cell generation cycle and $Z_s$ equals the greatest integer less than $(Y_b/Z_g)$, minus one and $Z_g$ is the sum of the reserved bandwidth values for the stations reserving bandwidth.

8. A method as claimed in claim 1 further comprising the step of providing each station with a local cycle value calculated in dependence upon an amount of reserved bandwidth remaining available at the station.

9. A method as claimed in claim 8 further comprising the steps of:
at each station, counting each reserved bandwidth cell received until reaching its local cycle value; and then
restarting the steps of counting the reserved bandwidth cells used and counting the reserved bandwidth cells received.

10. A method as claimed in claim 9 wherein the reserved bandwidth value is $X_i$ and the local cycle value is $Y_i$, respectively, for each station i calculated from $C_i/B_i = X_i/Y_i$, where $C_i$ is the actual bandwidth requested by the station i; and $B_i$ is a unused reserved bandwidth remaining at station i.

11. A method as claimed in claim 1 wherein the reserved bandwidth value is $X_i$, for each station i, calculated from $X_i = Y_b C_i/C_b$, where $C_b$ is the bus capacity for unreserved and reserved bandwidth cells, $C_i$ is the bandwidth requested by the station i, and $Y_b$ is an integer constant defining the cell generation cycle.

12. A method as claimed in claim 11 further comprising the step of generating a reset cell to end the cell generation cycle.

13. A method as claimed in claim 12 wherein at each station, the reset cell restarts the step of counting the reserved bandwidth cells used.

14. A method as claimed in claim 1 wherein the reserved bandwidth cells are empty isochronous cells.

15. A method of providing reserved bandwidth in a communications system comprising dual unidirectional and oppositely directed buses and stations connected therebetween, in which bandwidth is provided by fixed format cells, the method comprising the step of:
reserving bandwidth on a data bus in response to requests accepted from stations on a signal bus;
providing each station with a reserved bandwidth value calculated in dependence upon an amount of bandwidth requested by the station;
providing each station with a local cycle value calculated in dependence upon an amount of reserved bandwidth remaining available at the station;
generating a number of reserved bandwidth cells per a cell generation cycle in dependence upon a total bandwidth reserved by the stations;
at each station, counting each reserved bandwidth cell used until reaching the reserved bandwidth value;
counting each reserved bandwidth cell received until reaching its local cycle value; and then
restarting the steps of counting the reserved bandwidth cells used and counting the reserved bandwidth cells received.

16. A method as claimed in claim 15 wherein the number of reserved bandwidth cells is $X_H$ and the cell generation cycle is $Y_H$, calculated from $$X_H/Y_H = \sum_{i=1}^{N} C_i/C_b,$$

where $C_b$ is the bus capacity for unreserved and reserved bandwidth cells and $C_i$ are the bandwidths requested by each station i of N stations.

17. A method as claimed in claim 15 wherein the cells are distributed by generating a reserved bandwidth cell, then $Z_H$ non-reserved cell until $Y_H$ cells are generated, where $X_H$ is the number of reserved bandwidth cells and $Y_H$ is calculated from $$X_H/Y_H = X_H/Y_H = \sum_{i=1}^{N} C_i/C_b,$$

where $C_b$ is the bus capacity for unreserved and reserved bandwidth cells and $C_i$ are the bandwidths requested by each station i of N stations and $Z_H$ equals the greatest integer less than $(Y_H/X_H)$, minus one.

18. A method of providing reserved bandwidth in a communications system comprising dual unidirectional and oppositely directed buses and stations connected therebetween, in which bandwidth is provided by fixed format cells, the method comprising the step of:
reserving bandwidth on a data bus in response to requests accepted from stations on a signal bus;
providing each station with a reserved bandwidth value calculated in dependence upon an amount of bandwidth requested by the station;
providing each station with a local cycle value calculated in dependence upon an amount of reserved bandwidth remaining available at the station;
generating a number of reserved bandwidth cells per a cell generation cycle in dependence upon a total bandwidth reserved by the stations;
generating a reset cell to end the cell generation cycle, wherein at each station, the reset cell restarts the step of counting the reserved bandwidth cells used; and wherein the reserved bandwidth value is $X_i$, for each station i, calculated from $X_i = Y_b C_i/C_b$, where $C_b$ is the bus capacity for unreserved and reserved bandwidth cells, $C_i$ is the bandwidth requested by the station i, and $Y_b$ is an integer constant defining the cell generation cycle.

19. A method as claimed in claim 18 wherein the number of reserved bandwidth cells is $Z_g$ and the cell generation cycle is $Y_b$, where $Y_b$ is an integer constant and $Z_g$ is the sum of the reserved bandwidth values for the stations.

20. A method as claimed in claim 18 wherein the cells are distributed by generating a reserved bandwidth cell, then $Z_s$ nonreserved cell until $Y_b$ cells are generated, where $Y_b$ is an integer constant defining the cell generation cycle and $Z_s$ equals the greatest integer less than $(Y_b/Z_g)$, minus one and $Z_g$ is the sum of the reserved bandwidth values for the stations reserving bandwidth.

21. A method as claimed in claim 1 wherein the fixed format cells comprise a first bit for indicating whether the cell is busy, a second bit for indicating cell type, and a third bit for indicating a request.

* * * * *

UNITED STATES PATENT AND TRADEMARK OFFICE
CERTIFICATE OF CORRECTION

PATENT NO. : 5,001,707
DATED : March 19, 1991
INVENTOR(S) : Rungroj KOSITPAIBOON, Richard BREAULT and Van P.T. PHUNG It is certified that error appears in the above-identified patent and that said Letters Patent is hereby corrected as shown below:

ON THE TITLE PAGE: Item [75]
The first name of the first-named inventor is changed as follows:

Delete "Rungnoj" and insert therefor --Rungroj--.

Signed and Sealed this

Twelfth Day of January, 1993

Attest:

DOUGLAS B. COMER

Attesting Officer

Acting Commissioner of Patents and Trademarks